(12) United States Patent
Ghosh et al.

(10) Patent No.: US 9,136,892 B2
(45) Date of Patent: Sep. 15, 2015

(54) APPARATUS AND METHOD FOR UTILIZING A SMART RECEIVER SWITCH FOR IMPROVING IDLE MODE PERFORMANCE

(71) Applicant: QUALCOMM Incorporated, San Diego, CA (US)

(72) Inventors: Priyangshu Ghosh, Hyderabad (IN); Bhaskara Viswandham Batchu, Hyderabad (IN); Troy Russell Curtiss, Boulder, CO (US); Aditya Bohra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 14/103,076

(22) Filed: Dec. 11, 2013

(65) Prior Publication Data

US 2015/0162941 A1    Jun. 11, 2015

(51) Int. Cl.
*H04B 17/02* (2006.01)
*H04B 1/16* (2006.01)
*H04W 88/02* (2009.01)

(52) U.S. Cl.
CPC *H04B 1/16* (2013.01); *H04W 88/02* (2013.01)

(58) Field of Classification Search
USPC ............ 455/132, 133, 134, 135, 137, 343 A, 455/343.1; 375/347
See application file for complete search history.

(56) References Cited

U.S. PATENT DOCUMENTS

| 7,162,265 | B2 | 1/2007 | Ormson et al. |
| 8,023,896 | B2 | 9/2011 | Hildebrand et al. |
| 2010/0035570 | A1* | 2/2010 | Tsukio et al. ................ 455/254 |
| 2011/0244874 | A1 | 10/2011 | Fodor et al. |
| 2012/0077505 | A1 | 3/2012 | Wietfeldt et al. |
| 2013/0217386 | A1 | 8/2013 | Perets et al. |
| 2013/0281139 | A1* | 10/2013 | Wilhelmsson et al. ....... 455/500 |

* cited by examiner

*Primary Examiner* — Nguyen Vo
(74) *Attorney, Agent, or Firm* — Loza & Loza LLP (57) ABSTRACT

An apparatus, a method, and a computer program are disclosed, which can enable a wireless user equipment (UE) to reduce or avoid system losses, such as decode failures and the unavailability of page messages, which might otherwise result in a poor user experience. By way of example and not limitation, a UE may be configured to switch from a low-sensitivity receiver to a high-sensitivity receiver, or to a receive diversity configuration, when operating under poor channel conditions.

24 Claims, 7 Drawing Sheets

APPARATUS AND METHOD FOR UTILIZING A SMART RECEIVER SWITCH FOR IMPROVING IDLE MODE PERFORMANCE

TECHNICAL FIELD

Aspects of the present disclosure relate generally to wireless communication systems, and more particularly, to selection between receivers having different capabilities to improve user experience within wireless communication systems.

BACKGROUND

Wireless communication networks are widely deployed to provide various communication services such as telephony, video, data, messaging, broadcasts, and so on. Such networks, which are usually multiple access networks, support communications for multiple mobile devices by sharing the available network resources.

In wireless communications, a "multimode" architecture generally refers to a mobile device that can support multiple radio access technologies (RATs) simultaneously. For example, a multimode device (sometimes referred to as a dual SIM, dual active or DSDA device) may be capable of performing data communication using one RAT (e.g., a cdma2000 1x network), while engaged in a voice call using another RAT (e.g., a GSM network). In some examples, a multimode device with two or more different receivers can use these two or more receivers at the same time to receive a single signal; this mode of operation is called receive diversity.

In any wireless communication device, including but not limited to multimode devices, upon the device's power-up, the device generally needs to acquire a pilot signal from a nearby base station before it can receive and demodulate data packets from the base station. This pilot acquisition algorithm utilizes an RF receiver to search for and acquire pilot transmissions. In a multimode device with two or more receivers, in general, there is a selection of a subset (e.g., one) of the receivers to utilize for acquisition.

As the demand for mobile broadband access continues to increase, research and development continue to advance the wireless communication technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure enable a wireless user equipment (UE) to reduce or avoid system losses, such as decode failures and the unavailability of page messages, which might otherwise result in a poor user experience. By way of example and not limitation, a UE may be configured to switch from a low-sensitivity receiver to a high-sensitivity receiver, or to a receive diversity configuration, when operating under poor channel conditions.

In one aspect, the disclosure provides a method of wireless communication operable at a UE that includes a low-sensitivity receiver and a high-sensitivity receiver. Here, the method may include receiving, in an idle state, one or more downlink transmissions utilizing the low-sensitivity receiver, and requesting, in accordance with one or more performance characteristics of the low-sensitivity receiver, to switch from the low-sensitivity receiver to the high-sensitivity receiver.

Another aspect of the disclosure provides a UE configured for wireless communication. The UE may include a low-sensitivity receiver and a high-sensitivity receiver, as well as means for receiving, in an idle state, one or more downlink transmissions utilizing the low-sensitivity receiver, and means for requesting, in accordance with one or more performance characteristics of the low-sensitivity receiver, to switch from the low-sensitivity receiver to the high-sensitivity receiver.

Another aspect of the disclosure provides a UE configured for wireless communication. The UE may include at least one processor, a memory communicatively coupled to the at least one processor, a low-sensitivity receiver communicatively coupled to the at least one processor, and a high-sensitivity receiver communicatively coupled to the at least one processor. Here, the at least one processor is configured to receive, in an idle state, one or more downlink transmissions utilizing the low-sensitivity receiver, and to request, in accordance with one or more performance characteristics of the low-sensitivity receiver, to switch from the low-sensitivity receiver to the high-sensitivity receiver.

Another aspect of the disclosure provides a computer-readable storage medium operable at a UE that includes a low-sensitivity receiver and a high-sensitivity receiver. Here, the computer-readable storage medium includes instructions that, when executed by a processor, cause the processor to receive, in an idle state, one or more downlink transmissions utilizing the low-sensitivity receiver, and to request, in accordance with one or more performance characteristics of the low-sensitivity receiver, to switch from the low-sensitivity receiver to the high-sensitivity receiver.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In one or more aspects of the disclosure, a wireless communication device may periodically monitor receive conditions for a radio access technology when operating on a lower sensitivity receiver/antenna, and may request a higher sensitivity receiver/antenna when needed to prevent receive errors such as system losses, mobile terminated call misses, etc. Further, if the higher sensitivity receiver/antenna is granted, the radio access technology may also retain both lower and higher sensitivity receivers/antennas simultaneously to use diversity receiving, combining techniques to mitigate above mentioned issues if channel conditions deem it necessary. If, while in the receive diversity configuration, the signal conditions on the lower sensitivity receiver/antenna become sufficient to sustain error-free receive operation, the invention may also cover the technology's releasing of the higher sensitivity receiver/antenna, such that another concurrent technology may utilize it.

Figure 1:
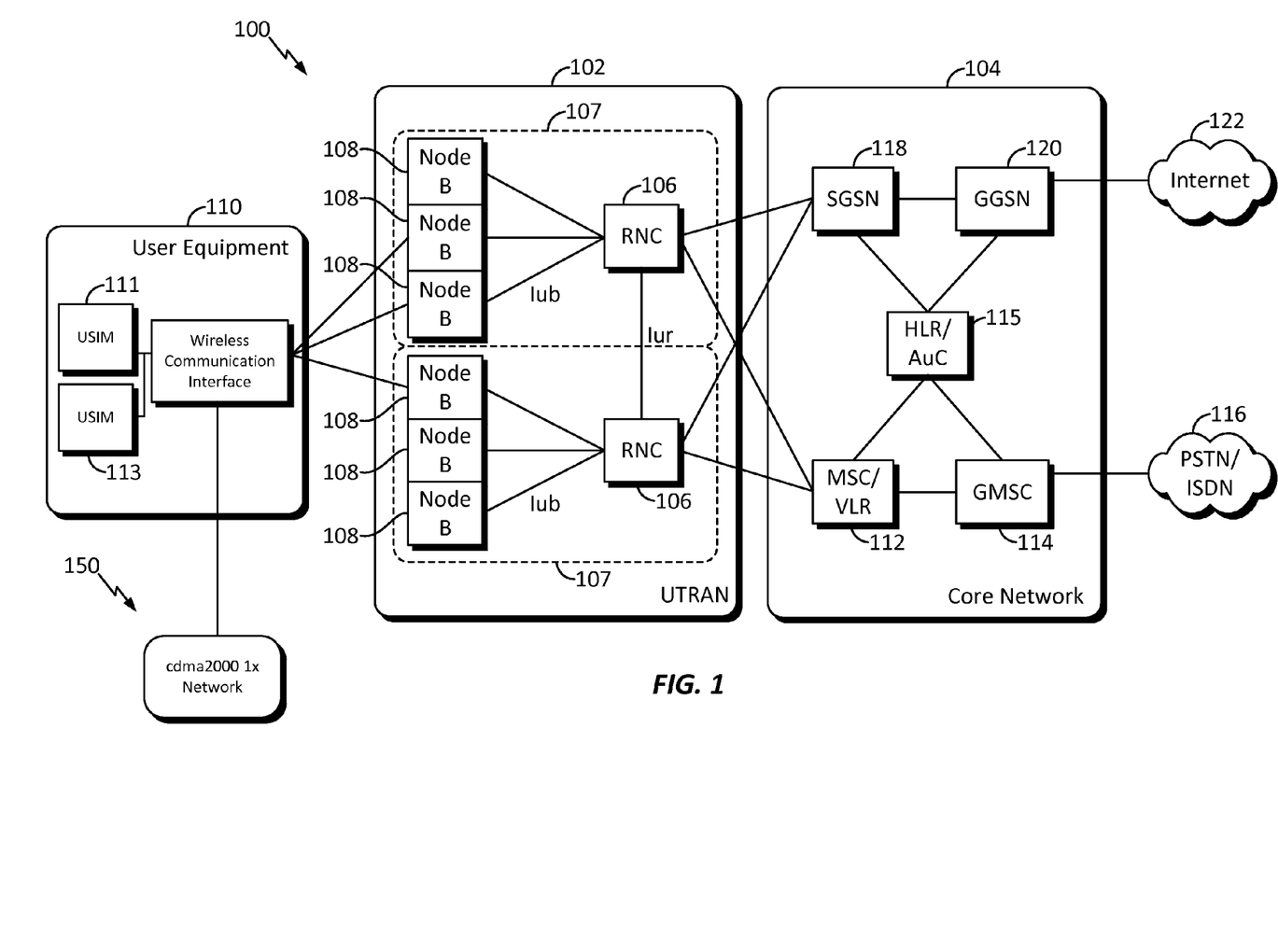
FIG. 1 is a block diagram conceptually illustrating an example of a telecommunications system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include one or more universal subscriber identity modules (USIM) 111 and 113, each of which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

As illustrated in FIG. 1, the UE 110 may be in communication not only with the UMTS wireless communication network 100, but in addition, may be in communication with at least one additional wireless communication network, such as a cdma2000 1x wireless communication network 150. Here, the UE 110 may utilize a first USIM 111 to carry its subscriber information corresponding to the UMTS network 100, and a second USIM 113 to carry its subscriber information corresponding to the 1x network 150. Of course, any number of USIMs may be utilized within the UE 110 to communicate with any corresponding number of wireless communication networks, including but not limited to the UMTS network 100 and the 1x network 150.

Here, the cdma2000 1x network 150 may include one or more base stations, as well as one or more core network elements, in many ways similar to those described in further detail above with respect to the UMTS network 100. That is, in an aspect of the disclosure, the cdma2000 1x network 150 may be configured to enable circuit-switched communication as well as packet-switched communication.

In some aspects of the disclosure, the UE 110 may be configured to utilize one wireless communication network (e.g., the 1x network 150) for data communication, and to utilize the other wireless communication network (e.g., the UMTS network 100) for voice communication. Of course, this combination of networks is not intended to be limiting in nature, and any suitable set of networks may be utilized for voice and data communication within the scope of the present disclosure. As a non-limiting example, a user may subscribe for service with an operator that has upgraded high-speed data capabilities utilizing one technology, but has better quality of service available for voice calls utilizing another (e.g., legacy) technology.

Figure 2:
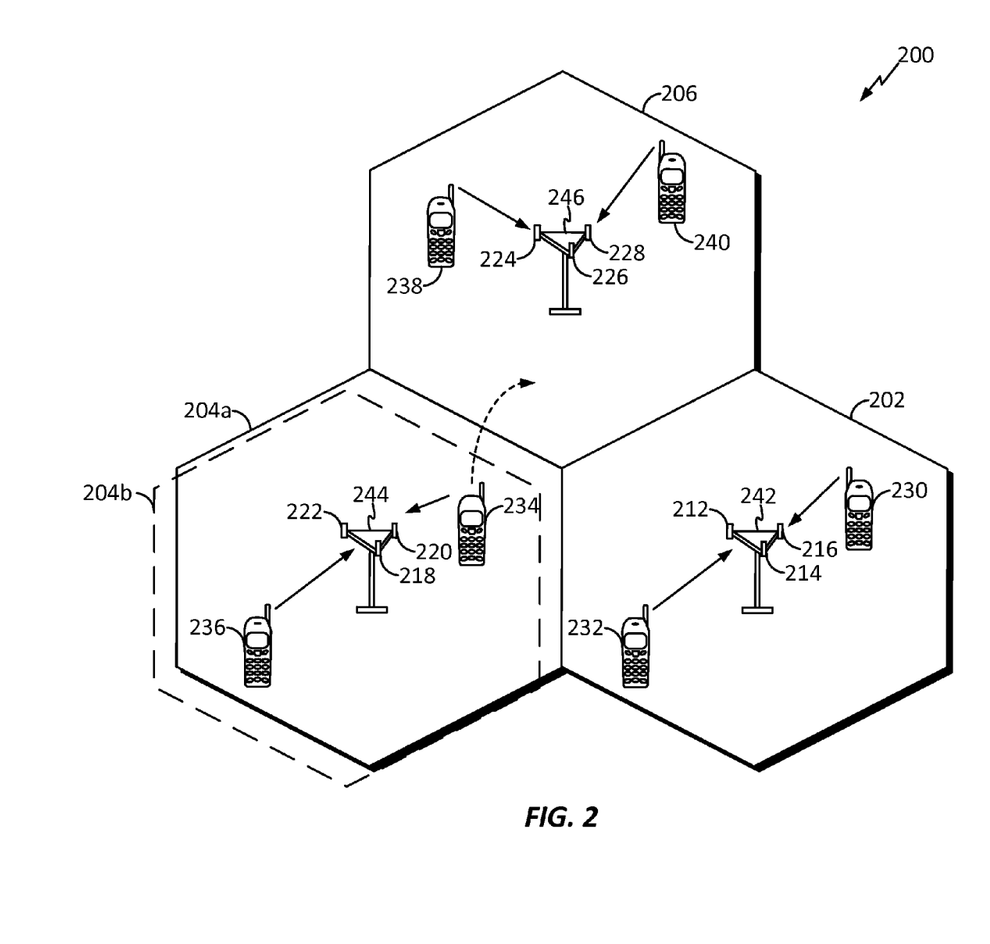
FIG. 2 is a conceptual diagram illustrating an example of an access network.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area).

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 104 (see FIG. 1) for all the UEs 230, 232, 234, 236, 238, and 240 in the respective cells 202, 204, and 206.

In some aspects of the disclosure, the illustrated geographically-defined cells 202, 204, and 206 may each be further divided into a plurality of cells, e.g., by utilizing different radio access technologies (RATs). For example, cell 204a may correspond to a first RAT, such as the UMTS network 100, and cell 204b, while in the same geographic region and, in some examples, served by the same base station 244, may correspond to a second RAT, such as the 1x network 150. Of course, in other examples, the different RATs, while available for providing service to the subscriber UE, may be provided by different, disparate base stations, which may or may not have overlapping geographic areas.

Figure 3:
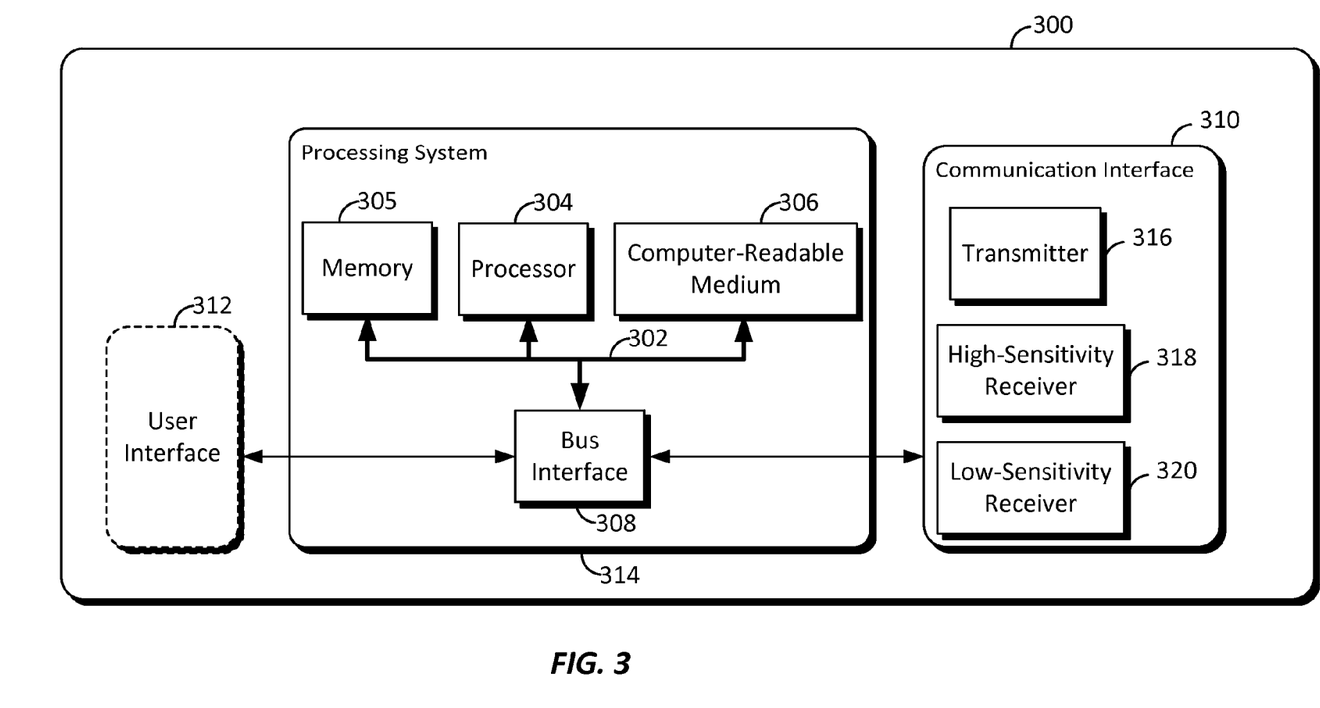
FIG. 3 is a block diagram illustrating an example of a hardware implementation for an apparatus employing a processing system.

Turning now to FIG. 3, a conceptual diagram is provided illustrating an example of a hardware implementation for an apparatus 300 employing a processing system 314. In accordance with various aspects of the disclosure, an element, or any portion of an element, or any combination of elements may be implemented with a processing system 314 that includes one or more processors 304. For example, the apparatus 300 may be a UE as illustrated in any one or more of FIGS. 1, 2, 4, and/or 5. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in an apparatus 300, may be used to implement any one or more of the processes described below and illustrated in FIGS. 6 and/or 7.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 may provide an interface between the bus 302 and, depending upon the nature of the apparatus, a user interface 312 (e.g., keypad, display, speaker, microphone, joystick, etc.). The bus interface 308 may further provide an interface between the bus 302 and a communication interface 310. The communication interface 310 provides a means for communicating with various other apparatus over a transmission medium.

In some examples, the communication interface 310 may include at least one transmitter 316, and at least one receiver. In some aspects of the disclosure, the apparatus 300 may be a multimode UE. Within such a multimode UE the communication interface 310 may include a plurality of receivers. Here, it may be the case that one receiver is a high-sensitivity receiver and the other receiver is a low-sensitivity receiver. In such an example, the communication interface 310 may include a high-sensitivity receiver 318 and a low-sensitivity receiver 320. Here, the receivers 318 may be configured in any suitable fashion, and may in various examples include any suitable parts of a receive chain, including but not limited to antennas.

Within the present disclosure, the terms "high-sensitivity" and "low-sensitivity" are not intended to be limiting in scope, or to be absolute descriptions of sensitivity values, but rather, are intended broadly to indicate that the high-sensitivity receiver 318 has higher sensitivity than the low-sensitivity receiver 320. Here, sensitivity refers generally to a capability to detect signals transmitted over an air channel having a given magnitude, wherein a higher-sensitivity receiver can generate a response according to a lower magnitude signal than the lower-sensitivity receiver can detect. The sensitivity of a given receiver can be affected by any number of factors, such as the geometry and/or placement of the antenna, the quality of an amplifier within the receive circuitry, or other factors.

Figure 4:
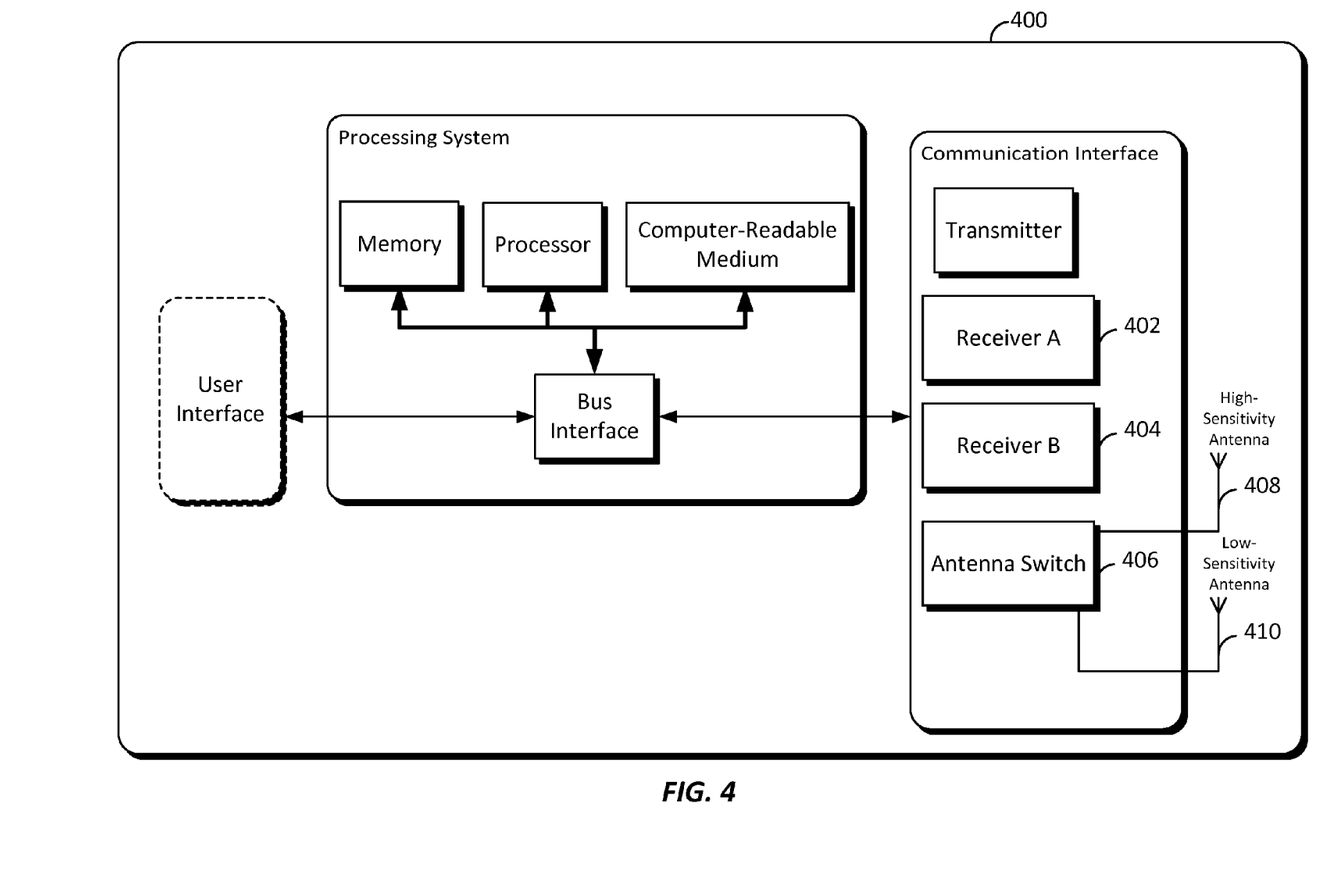
FIG. 4 is another block diagram illustrating an example of a hardware implementation for an apparatus employing a processing system.

In another example, illustrated in FIG. 4, rather than having a high-sensitivity receiver and a low-sensitivity receiver, a UE 400 may have a plurality of receivers, such as receiver A 402 and receiver B 404, each having the same or similar sensitivity. However, the UE 400 may include a plurality of antennas, such as a high-sensitivity antenna 408 and a low-sensitivity antenna 410. Here, the coupling between a particular receiver and a particular antenna may be controlled by an antenna switch 406, with suitable switching circuitry for radio connection.

When a radio access technology (RAT) is in communication, it utilizes a receiver and an antenna. Within the present disclosure, methods, processes, and algorithms are described with reference to the selection of a particular receiver, that is, with reference to FIG. 3, the high-sensitivity receiver 318 or the low-sensitivity receiver 320. However, the methods, processes, and algorithms described herein may equivalently be applied to the UE 400 illustrated in FIG. 4, including the selection of a particular antenna, that is, the low-sensitivity antenna 410 or the high-sensitivity antenna 408. That is, it may be understood within the present disclosure that the selection of the high-sensitivity receiver 318 may refer in addition or in the alternative to selection of the high-sensitivity antenna 408; and the selection of the low-sensitivity receiver 320 may refer in addition or in the alternative to selection of the low-sensitivity antenna 410.

When a particular RAT utilized by the UE needs a receiver to carry out an operation such as system or pilot acquisition, this RAT makes a request for a receiver. Based on the availability of the hardware, the RAT may be assigned the high-sensitivity receiver 318 or the low-sensitivity receiver 320. Once the pilot is acquired, the UE will generally continue to use the granted receiver for page demodulation or other communication activities.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 5:
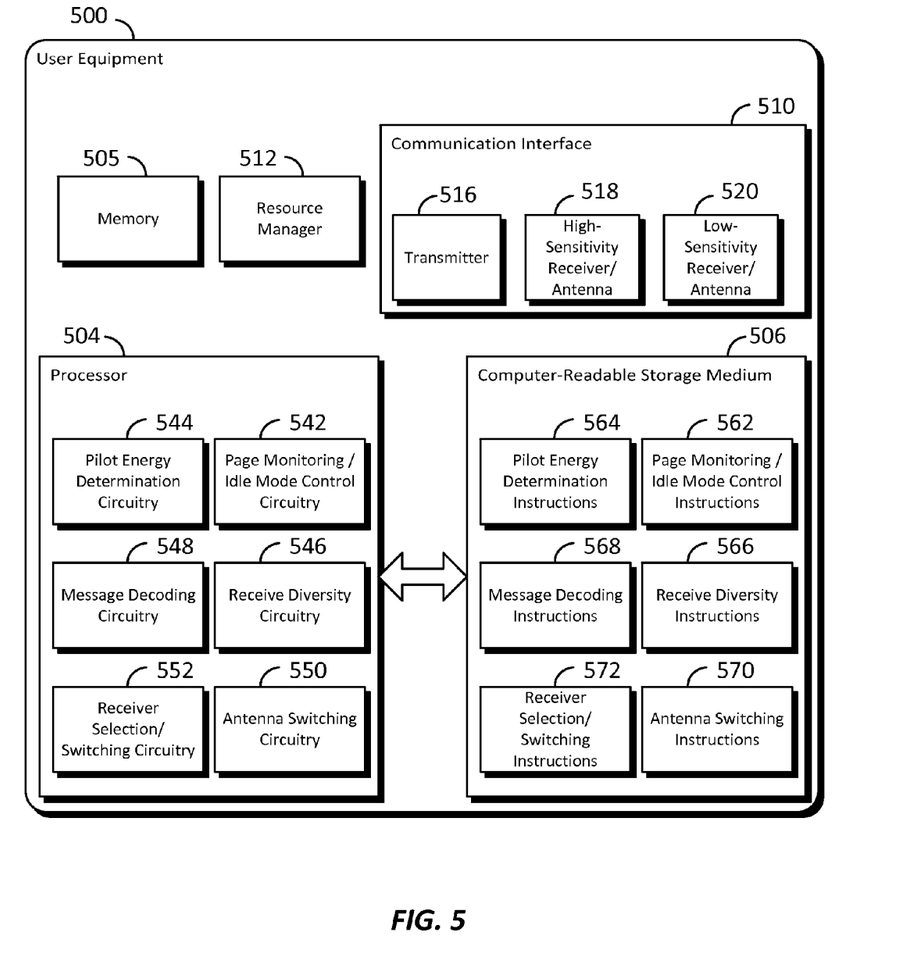
FIG. 5 is a block diagram illustrating further details of an apparatus for selecting a receiver in accordance with some aspects of the disclosure.

FIG. 5 is a simplified block diagram illustrating some of the components of a UE 500 configured according to one or more aspects of the present disclosure. In various examples, the UE 500 may be configured to perform any one or more of the functions described in the present disclosure, and in particular, may implement all or part of the process illustrated in FIGS. 6 and/or 7, described above. For example, the UE 500 may be a UE as illustrated in any one or more of FIGS. 1, 2, 3, and/or 4.

The UE 500 includes a processor 504 coupled to or placed in electrical communication with a computer-readable storage medium 506. The processor 504, as utilized in the UE 500, may be used to implement any one or more of the processes described below and illustrated in FIGS. 6 and/or 7, including but not limited to blocks 402, 406, and 412. The processor 504 may, in one or more examples, include page monitoring/idle mode control circuitry 542 configured for various functions, including, for example, placing the UE 500 into a low-power state, and waking up according to a timer or other schedule to receive one or more downlink transmissions such as page messages, control messages, or the like. In a further aspect, the processor 504 may include pilot energy determination circuitry 544 configured for various functions, including, for example, detecting the energy content of a received pilot signal. For example, the pilot energy determination circuitry 544 may be configured to implement one or more of the functions described below in relation to FIGS. 6 and 7, including, e.g., blocks 704 and 716. In a further aspect, the processor 504 may include receive diversity circuitry 546 configured for various functions, including, for example, implementing receive diversity to combine signals received utilizing both the high-sensitivity receiver/antenna 518 and the low-sensitivity receiver 520. For example, the receive diversity circuitry 546 may be configured to implement one or more of the functions described below in relation to FIGS. 6 and 7, including, e.g., blocks 708 and/or 710. In a further aspect, the processor 504 may include message decoding circuitry 548 configured for various functions, including, for example, decoding (or attempting to decode) information or data contained on a received transmission, and accordingly, detecting decoding failures if and when they occur. For example, the message decoding circuitry 548 may be configured to implement one or more of the functions described below in relation to FIGS. 6 and 7, including, e.g., blocks 702 and 716. In a further aspect, the processor 504 may include antenna switching circuitry 550 configured for various functions, including, for example, controlling an antenna switch 406 for selecting a connection between antennas and receiver circuits. For example, in a configuration such as the UE 400 illustrated in FIG. 4, the antenna switching circuitry 550 may be configured to implement one or more of the functions described below in relation to FIGS. 6 and 7, including, e.g., blocks 710, 712, and/or 718. In a further aspect, the processor 504 may include receiver selection/switching circuitry 552 configured for various functions, including, for example, selecting from among a plurality of receivers and/or antennas for receiving incoming transmissions. For example, in a configuration such as the UE 300 illustrated in FIG. 3, or such as the UE 400 illustrated in FIG. 4, the receiver selection/switching circuitry 552 may be configured to implement one or more of the functions described below in relation to FIGS. 6 and 7, including, e.g., blocks 710, 712, and/or 718.

The computer-readable storage medium 506 may be configured to operate in tandem with the processor 504 for carrying out the above-described functions. In one or more examples, the computer-readable storage medium 506 may include page monitoring/idle mode control instructions 562 configured for various functions, including, for example, placing the UE 500 into a low-power state, and waking up according to a timer or other schedule to listen for incoming page messages, control messages, or the like. In a further aspect, the computer-readable storage medium 506 may include pilot energy determination instructions 564 configured for various functions, including, for example, detecting the energy content of a received pilot signal. For example, the pilot energy determination instructions 564 may be configured to implement one or more of the functions described below in relation to FIGS. 6 and 7, including, e.g., blocks 704 and 716. In a further aspect, the computer-readable storage medium 506 may include receive diversity instructions 566 configured for various functions, including, for example, implementing receive diversity to combine signals received utilizing both the high-sensitivity receiver/antenna 518 and the low-sensitivity receiver 520. For example, the receive diversity instructions 566 may be configured to implement one or more of the functions described below in relation to FIGS. 6 and 7, including, e.g., blocks 708 and/or 710. In a further aspect, the computer-readable storage medium 506 may include message decoding instructions 568 configured for various functions, including, for example, decoding (or attempting to decode) information or data contained on a received transmission, and accordingly, detecting decoding failures if and when they occur. For example, the message decoding instructions 568 may be configured to implement one or more of the functions described below in relation to FIGS. 6 and 7, including, e.g., blocks 702 and 716. In a further aspect, the computer-readable storage medium 506 may include antenna switching instructions 570 configured for various functions, including, for example, controlling an antenna switch 406 for selecting a connection between antennas and receiver circuits. For example, in a configuration such as the UE 400 illustrated in FIG. 4, the antenna switching instructions 570 may be configured to implement one or more of the functions described below in relation to FIGS. 6 and 7, including, e.g., blocks 710, 712, and/or 718. In a further aspect, the computer-readable storage medium 506 may include receiver selection/switching instructions 572 configured for various functions, including, for example, selecting from among a plurality of receivers and/or antennas for receiving incoming transmissions. For example, in a configuration such as the UE 300 illustrated in FIG. 3, or such as the UE 400 illustrated in FIG. 4, the receiver selection/switching instructions 572 may be configured to implement one or more of the functions described below in relation to FIGS. 6 and 7, including, e.g., blocks 710, 712, and/or 718.

Further, the UE 500 may include a memory 505 (e.g., the same as or similar to the memory 305 illustrated in FIG. 3) and a communication interface 510 communicatively coupled to the processor 504. Here, the communication interface 510 may be the same as or similar to either of the communication interfaces 310 or 410 illustrated in FIGS. 3 and 4, and accordingly may include a transmitter 516, a high-sensitivity receiver/antenna 518, and a low-sensitivity receiver/antenna 520. Still further, the UE 500 may include a resource manager 512 configured to manage radio resources such as those corresponding to the communication interface 510, and may be configured to receive requests from a RAT, e.g., operating utilizing the processor 504, to receive resource requests and to grant or reject the RAT access to the high-sensitivity receiver/antenna 518 or the low-sensitivity receiver/antenna 520.

Typically, within a multimode UE such as the UE 500 (see FIG. 5), more than one transmitter and/or receiver is present in order to support the multiple technologies. However, in a UE that includes a plurality of receiver circuits, all of the receiver circuits need not be of similar capabilities, and accordingly, the communication interface may include a high-sensitivity receiver/antenna 518 and a low-sensitivity receiver/antenna 520, as described above.

When the UE 500 needs a receiver to carry out system or pilot acquisition for a particular RAT, this RAT may make a request (e.g., a request to the processor 504) for receiver resources. Based on the availability of the hardware, the RAT may be assigned the high-sensitivity receiver 518 or the low-sensitivity receiver 520, and with this assigned receiver, the UE 500 may carry out pilot acquisition. Once the pilot is acquired, the UE 500 may continue to use the granted receiver for page demodulation or other communication activities.

One potential issue may arise when a UE 500 selects between receivers of different sensitivities: namely, when the low-sensitivity receiver 520 has insufficient sensitivity for existing conditions. For example, when the UE 500, utilizing a given RAT, enters into a page monitoring state or a paging state, it could be operating on the low-sensitivity receiver 520 or the high-sensitivity receiver 518, depending upon the earlier grant. Here, problems can arise if the RAT operates on the low-sensitivity receiver 520 when the network conditions are poor. Under such conditions, the UE 500 may not be able to decode page messages correctly, or it may not even receive the incoming page message. Over time, multiple decode failures, or the unavailability of page messages for a long time, can lead to a system loss. Frequent system losses degrade the call performance of the UE 500, and can result in a poor user experience.

In an aspect of the present disclosure, however, these system losses can be reduced or avoided if the active RAT operates on the high-sensitivity receiver 518 rather than the low-sensitivity receiver 520. Use of the high-sensitivity receiver 518 may further eventually improve the performance of the UE 500 and enhance the user's experience. Thus, some aspects of the present disclosure may place an active RAT on the high-sensitivity receiver 520 if the active RAT is operating on the low-sensitivity receiver 520 in a paging state.

That is, according to one or more aspects of the present disclosure, a RAT may be enabled to switch from a poor performing (e.g., a lower sensitivity) receiver to a potentially better performing (e.g., higher sensitivity) receiver when operating under poor channel conditions.

In some implementations, the use of the high-sensitivity receiver 518 may be hard-coded (static) by the respective RAT. However, such a limitation would force the other coexisting RAT (or RATs) to use a lower-sensitivity receiver, which would likely reduce the performance of those RATs. Thus, this hard rule algorithm is less than optimal.

Figure 6:
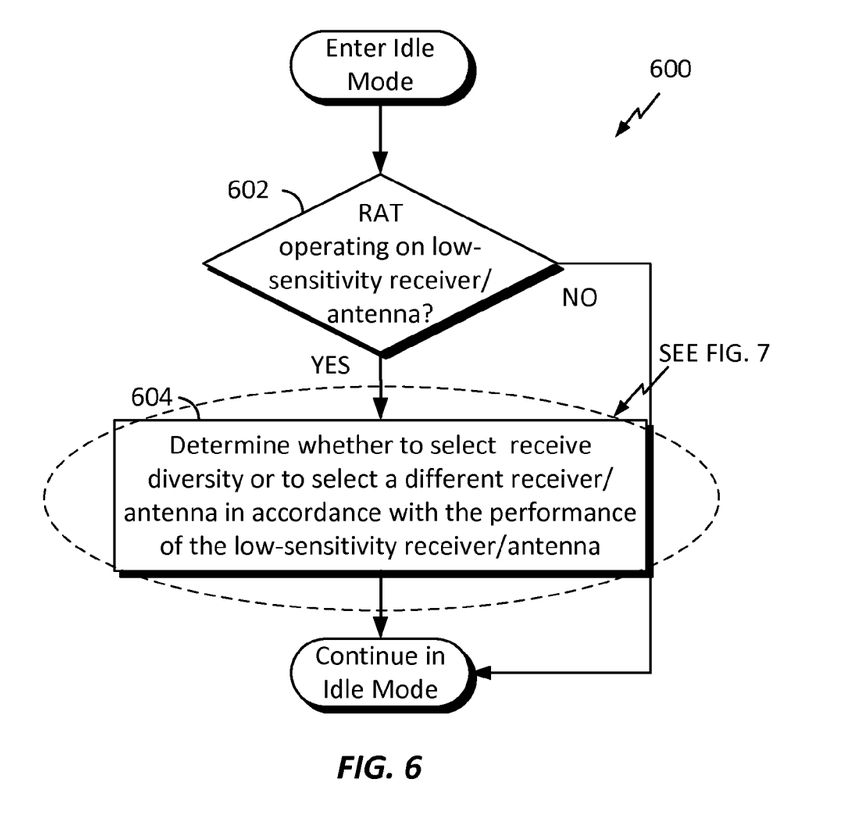
FIG. 6 is a flow chart illustrating a process for selecting a receiver in accordance with some aspects of the disclosure.

Thus, an algorithm may be utilized for determining when a RAT should switch over to the higher-sensitivity receiver. FIG. 6 is a flow chart illustrating one example of a process 600 for making such a determination. In some examples, the process 600 may be implemented by a wireless device such as the UE 110 illustrated in FIG. 1, the UE 300 illustrated in FIG. 3, the UE 400 illustrated in FIG. 4, the UE 500 illustrated in FIG. 5, or any other suitable wireless device. In some examples, the process 600 may be implemented by at least one processor, such as the processor 304 or 504, configured to perform the described functions. In other examples, the process 600 may be implemented by any suitable apparatus or means for carrying out the described functions.

In the illustration, it may be assumed that a multi-mode UE, such as the UE 500, is configured for operation utilizing at least one RAT. The process begins when the RAT enters into an idle mode or idle state. Here, an idle mode may generally refer to any mode of operation wherein the UE 500 utilizes receiver circuitry to monitor for downlink (or forward link) transmissions, including but not limited to transmissions such as page messages, pilot transmissions, control channel transmissions, system information, etc. In some examples, the idle mode may be a mode for power savings, e.g., wherein one or more operational portions of the UE 500 may be put into a sleep state, turned off, or otherwise in a reduced power consumption mode. Further, in some examples, the idle mode may be a mode of relatively low activity, that is, where the RAT is not involved in active data communication.

In one example, the process 600 may run once every frame, every slot, or according to any other suitable schedule, deciding at each iteration whether switching to the better receiver, as described below, is appropriate. The decision whether to switch to utilize receive diversity, or to switch over to the better receiver, may be made based upon factors such as the received pilot energy observed by the mobile device, as well as based upon decoding failures of the base station messages, as described in further detail below.

At block 602, the UE 500 may determine whether the RAT is operating on the low-sensitivity receiver/antenna 520. That is, in some examples, prior to entering into the idle mode, a selection of a receiver (and/or an antenna) for the RAT to utilize may be made in accordance with any suitable factors, such as signal strength, availability of the receiver/antenna, etc., or, in other cases, based on no particular factors or measurements, and based on any suitable reason, such as simply maintaining a connection with a receiver or antenna that was recently in use. In some examples, the determination at step 602 may correspond to a determination as to whether any receiver, antenna, or combination of receiver and antenna having a higher sensitivity that the one the RAT is currently utilizing, is available for the RAT to use.

If the RAT is not operating on the low-sensitivity receiver/antenna 520, then the process may simply continue in idle mode utilizing the assigned high-sensitivity receiver/antenna 518. However, if the RAT is operating on the low-sensitivity receiver/antenna 520, then the process may proceed to step 604, wherein the UE 500 may determine whether to select receive diversity or to select a different receiver/antenna.

In various aspects of the disclosure, one or more factors, parameters, or conditions may be checked to determine whether to select receive diversity or to select a different receiver/antenna. That is, in various scenarios, the UE 500 may benefit by switching over from the low-sensitivity receiver/antenna 520 to utilize the high-sensitivity receiver/antenna 518, or from simultaneously utilizing both receivers in a receive diversity configuration. Thus, when the UE 500 determines that the performance of the low-sensitivity receiver/antenna is insufficient for an acceptable user experience, then the UE may switch to the high-sensitivity receiver/antenna 518.

In various aspects of the disclosure, as described in further detail below, switching to the high-sensitivity receiver/antenna 518 may include releasing the low-sensitivity receiver/antenna 520 and only utilizing the high-sensitivity receiver/antenna 518, or in other examples, maintaining use of the low-sensitivity receiver 520 as well as utilizing the high-sensitivity receiver 518 in a receive diversity configuration.

Figure 7:
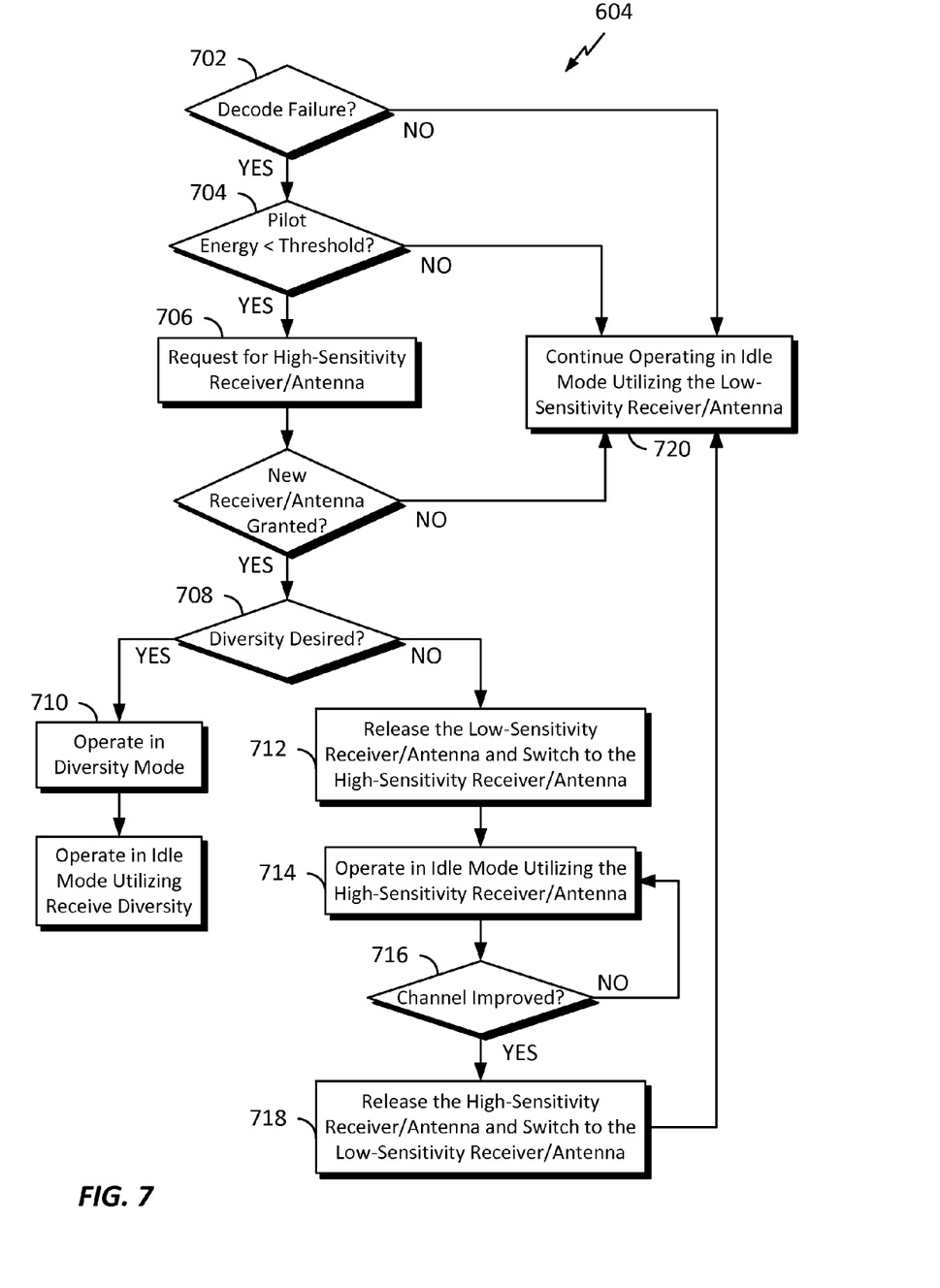
FIG. 7 is a flow chart illustrating further details of a process for selecting a receiver in accordance with some aspects of the disclosure.

FIG. 7 is a flow chart illustrating one example of a process that may be utilized for determining whether to select receive diversity or to select a different receiver/antenna, e.g., corresponding to step 604 in FIG. 6. In the illustrated process, at block 702, the UE 500 may determine whether decoding failures have occurred, such that selection of receive diversity or selection of a different receiver/antenna may be in order. As one example, while in the idle mode, the UE 500 may be configured to receive incoming page messages, e.g., on a page channel or a page indicator channel. However, when configured with the low-sensitivity receiver/antenna 520, the probability that the UE 500 may fail to decode the incoming page messages may be increased. In some aspects of the disclosure, at block 702, the UE 500 may determine whether a number of decoding failures is greater than a suitable decoding failure threshold. In other aspects of the disclosure, at step 702, the UE 500 may determine whether a decoding failure rate is greater than a suitable decoding failure rate threshold.

If the decoding failure condition does not merit selecting receive diversity or selecting a different receiver/antenna, then the process may proceed to block 720, wherein the UE 500 may simply continue operating in the idle mode, utilizing the low-sensitivity receiver/antenna 520. On the other hand, under a decoding failure condition, the UE 500 may proceed to block 704, and determine whether a received pilot energy is less than a suitable pilot energy threshold. Here, the threshold may in some examples be a predetermined (e.g., fixed) value, and in other examples may be a configurable value. A configurable threshold may be configured by the UE 500, and may take a value as indicated by signaling or control messages received from an access network. Further, the pilot energy may be determined in accordance with any suitable measurement of any one or more pilot channel(s) corresponding to any one or more cell(s) or sector(s), including but not limited to a serving cell.

If the detected pilot energy is not less than the threshold, then the process may proceed to block 720, wherein the UE 500 may simply continue operating in the idle mode, utilizing the low-sensitivity receiver/antenna 520. On the other hand, under a low pilot energy condition, the UE 500 may proceed to block 706, wherein the RAT within the UE 500 may request to use the high-sensitivity receiver/antenna 518. For example, the processor 504, operating on behalf of the RAT, may request for the resource manager 512 to grant for the RAT access to the high-sensitivity receiver/antenna 518. In some aspects of the disclosure, the resource manager 512 may reject the request for the high-sensitivity receiver/antenna 518. In this case, the process may proceed to block 720, wherein the UE 500 may simply continue operating in the idle mode, utilizing the low-sensitivity receiver/antenna 520. On the other hand, if use of the high-sensitivity receiver/antenna 518 is granted, then the process may proceed to block 708, wherein the UE 500 may determine whether receive diversity may be desired.

As described above, with receive diversity, the UE 500 may be configured to receive an incoming transmission utilizing two or more spatially separated antennas, such that the signals may be combined in such a way as to improve the performance of the UE 500 in receiving the transmission. In an aspect of the disclosure, in accordance with any suitable factors, the UE 500 may determine at block 710 to operate in receive diversity mode. Factors to consider in determining whether to impose receive diversity may include measurements of channel conditions with one or both receivers/antennas, availability of the plurality of receivers/antennas (i.e., whether they are in use by another RAT), or other suitable factors.

If receive diversity is not desired, then the process may proceed to block 712, wherein the UE 500 may release the low-sensitivity receiver/antenna 520, and switch to the high-sensitivity receiver/antenna 518. Thus, at block 714, the UE 500 may operate in the idle mode utilizing the high-sensitivity receiver/antenna 518. In this way, the UE 500 may improve the performance of receiving incoming transmissions, thereby improving the user experience.

In a further aspect of the disclosure, even while utilizing the high-sensitivity receiver/antenna 518, the UE 500 may be configured to continue monitoring one or more channel conditions, such as decoding failures, pilot energy, or other suitable factors, in order to determine whether the channel improves. That is, while operating utilizing the high-sensitivity receiver/antenna 518, it may come to pass that an improved channel may result in the low-power receiver/antenna becoming sufficient for an acceptably good user experience. In this case, at block 716, the UE 500 may determine that the channel has sufficiently improved, in which case the process may proceed to block 718, and release the high-sensitivity receiver/antenna 518 and switch to the low-sensitivity receiver/antenna 520. Thereafter, the process may proceed to block 720, wherein the UE 500 may continue operating in the idle mode utilizing the low-sensitivity receiver/antenna 520.

The process 604 (and the process 600) may end when the UE 500 comes out of its idle mode, e.g., when a page message indicating a mobile-terminated call is initiated, or when a user initiates a mobile-originated call.

In one configuration, the UE 500 for wireless communication includes means for receiving, in an idle state, one or more downlink transmissions utilizing a low-sensitivity receiver/antenna 520. For example, the processor 504, the page monitoring/idle mode control circuitry 542 and/or the message decoding circuitry 548 may function for receiving downlink transmissions utilizing the low-sensitivity receiver/antenna 520.

The UE 500 may further include means for requesting, in accordance with one or more performance characteristics of the low-sensitivity receiver/antenna 520, to switch from the low-sensitivity receiver/antenna 520 to a high-sensitivity receiver/antenna 518. For example, the processor 504, the pilot energy determination circuitry 544 and/or the message decoding circuitry 548 may be utilized to determine suitable performance characteristics, and the receiver selection/switching circuitry 552 may accordingly function to request to switch from the low-sensitivity receiver/antenna 520 to the high-sensitivity receiver/antenna 518.

The UE 500 may further include means for determining the performance of the low-sensitivity receiver/antenna 520. For example, the processor 504, the pilot energy determination circuitry 544 and/or the message decoding circuitry 548 may be utilized to determine the performance of the low-sensitivity receiver/antenna 520.

The UE 500 may further include means for requesting a resource manager 512 for authorization to utilize the high-sensitivity receiver/antenna 518 either individually to receive further downlink transmissions, or in coordination with the low-sensitivity receiver/antenna 520 in a receive diversity configuration to receive the further downlink transmissions. For example, the processor 504, the receiver selection/switching circuitry, the receive diversity circuitry 546, and/or the antenna switching circuitry 550 may be utilized to request authorization to utilize one or both receivers/antennas to receive further downlink transmissions.

The UE 500 may further include means for receiving a grant to switch from the low-sensitivity receiver/antenna 520 to the high-sensitivity receiver/antenna 518. For example, the processor 504, the receiver selection/switching circuitry, and/or the antenna switching circuitry 550 may be utilized to receive the grant to switch between receivers/antennas.

The UE 500 may further include means for operating in a receive diversity mode simultaneously utilizing both the low-sensitivity receiver/antenna 520 and the high-sensitivity receiver/antenna 518. For example, the processor 504, the receiver selection/switching circuitry 552, and/or the antenna switching circuitry 550 may be utilized for operating in the receive diversity mode.

The UE 500 may further include means for determining an improvement in channel conditions. For example, the processor 504, the pilot energy determination circuitry 544, and/or the message decoding circuitry 548 may be utilized for determining improvements in the channel conditions.

The UE 500 may further include means for switching from the receive diversity mode to the low-sensitivity receiver/antenna 520. For example, the processor 504, the receiver selection/switching circuitry 552, the receive diversity circuitry 546, and/or the antenna switching circuitry 550 may be utilized for switching from the receive diversity mode to the low-sensitivity receiver 520.

The UE 500 may further include means for receiving a grant (e.g., from the resource manager 512) to switch from the low-sensitivity receiver/antenna 520 to the high-sensitivity receiver/antenna 518. For example, the processor 504, the receiver selection/switching circuitry 552, and/or the antenna switching circuitry 550 may be utilized for receiving a grant to switch between receivers/antennas.

The UE 500 may further include means for releasing the low-sensitivity receiver/antenna 520. For example, the processor 504, the receiver selection/switching circuitry 552, and/or the antenna switching circuitry 550 may be utilized for releasing the low-sensitivity receiver/antenna 520.

The UE 500 may further include means for receiving one or more page messages utilizing the high-sensitivity receiver/antenna 518. For example, the processor 504, the page monitoring/idle mode control circuitry 542, and/or the message decoding circuitry 548 may be utilized for receiving page messages utilizing the high-sensitivity receiver/antenna 518.

The UE 500 may further include means for determining an improvement in channel conditions. For example, the processor 504, the pilot energy determination circuitry 544, and/or the message decoding circuitry 548 may be utilized for determining an improvement in channel conditions.

The UE 500 may further include means for switching from the high-sensitivity receiver/antenna 518 to the low-sensitivity receiver/antenna 520. For example, the processor 504, the receiver selection/switching circuitry 552, and/or the antenna switching circuitry 550 may be utilized for switching between receivers/antennas.

In one aspect, the aforementioned means may be the processor(s) 304 and/or 504 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIG. 1, 3, or 4, and utilizing, for example, the processes and/or algorithms described herein in relation to FIGS. 6 and/or 7.

Several aspects of a telecommunications system have been presented with reference to a UMTS system. As those skilled in the art will readily appreciate, various aspects described throughout this disclosure may be extended to other telecommunication systems, network architectures and communication standards. By way of example, various aspects may be extended to systems employing Long Term Evolution (LTE) (in FDD, TDD, or both modes), LTE-Advanced (LTE-A) (in FDD, TDD, or both modes), cdma2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-7 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication operable at a user equipment (UE) that comprises a low-sensitivity receiver and a high-sensitivity receiver, the method comprising:
   in an idle state, receiving one or more downlink transmissions utilizing the low-sensitivity receiver;
   determining a decoding failure of the one or more downlink transmissions;
   determining whether or not a pilot energy of the one or more downlink transmissions is less than a pilot energy threshold; and requesting to switch from the low-sensitivity receiver to the high-sensitivity receiver, in connection with the decoding failure and the pilot energy being less than the pilot energy threshold.

2. The method of claim 1, wherein the requesting to switch from the low-sensitivity receiver to the high-sensitivity receiver comprises requesting a resource manager for authorization to utilize the high-sensitivity receiver either individually to receive further downlink transmissions, or in coordination with the low-sensitivity receiver in a receive diversity configuration to receive the further downlink transmissions.

3. The method of claim 1, further comprising:
receiving a grant to switch from the low-sensitivity receiver to the high-sensitivity receiver; and
operating in a receive diversity mode simultaneously utilizing both the low-sensitivity receiver and the high-sensitivity receiver.

4. The method of claim 3, further comprising:
determining an improvement in channel conditions; and
switching from the receive diversity mode to the low-sensitivity receiver.

5. The method of claim 1, further comprising:
receiving a grant to switch from the low-sensitivity receiver to the high-sensitivity receiver; and
releasing the low-sensitivity receiver and receiving one or more page messages utilizing the high-sensitivity receiver.

6. The method of claim 5, further comprising:
determining an improvement in channel conditions, and
switching from the high-sensitivity receiver to the low-sensitivity receiver.

7. A user equipment (UE) configured for wireless communication, comprising:
a low-sensitivity receiver and a high-sensitivity receiver;
means for receiving, in an idle state, one or more downlink transmissions utilizing the low-sensitivity receiver;
means for determining a decoding failure of the one or more downlink transmissions;
means for determining whether or not a pilot energy of the one or more downlink transmissions is less than a pilot energy threshold; and
means for requesting to switch from the low-sensitivity receiver to the high-sensitivity receiver, in connection with the decoding failure and the pilot energy being less than the pilot energy threshold.

8. The UE of claim 7, wherein the means for requesting to switch from the low-sensitivity receiver to the high-sensitivity receiver is configured to request a resource manager for authorization to utilize the high-sensitivity receiver either individually to receive further downlink transmissions, or in coordination with the low-sensitivity receiver in a receive diversity configuration to receive the further downlink transmissions.

9. The UE of claim 7, further comprising:
means for receiving a grant to switch from the low-sensitivity receiver to the high-sensitivity receiver; and
means for operating in a receive diversity mode simultaneously utilizing both the low-sensitivity receiver and the high-sensitivity receiver.

10. The UE of claim 9, further comprising:
means for determining an improvement in channel conditions; and
means for switching from the receive diversity mode to the low-sensitivity receiver.

11. The UE of claim 7, further comprising:
means for receiving a grant to switch from the low-sensitivity receiver to the high-sensitivity receiver;
means for releasing the low-sensitivity receiver; and
means for receiving one or more page messages utilizing the high-sensitivity receiver.

12. The UE of claim 11, further comprising:
means for determining an improvement in channel conditions; and
means for switching from the high-sensitivity receiver to the low-sensitivity receiver.

13. A user equipment (UE) configured for wireless communication, comprising:
at least one processor;
a memory communicatively coupled to the at least one processor;
a low-sensitivity receiver communicatively coupled to the at least one processor; and
a high-sensitivity receiver communicatively coupled to the at least one processor,
wherein the at least one processor is configured to:
receive, in an idle state, one or more downlink transmissions utilizing the low-sensitivity receiver;
determine a decoding failure of the one or more downlink transmissions;
determine whether or not a pilot energy of the one or more downlink transmissions is less than a pilot energy threshold; and
request to switch from the low-sensitivity receiver to the high-sensitivity receiver, in connection with the decoding failure and the pilot energy being less than the pilot energy threshold.

14. The UE of claim 13, further comprising a resource manager,
wherein the at least one processor, being configured to request to switch from the low-sensitivity receiver to the high-sensitivity receiver, is further configured to request the resource manager for authorization to utilize the high-sensitivity receiver either individually to receive further downlink transmissions, or in coordination with the low-sensitivity receiver in a receive diversity configuration to receive the further downlink transmissions.

15. The UE of claim 13, wherein the at least one processor is further configured to:
receive a grant to switch from the low-sensitivity receiver to the high-sensitivity receiver; and
operate in a receive diversity mode simultaneously utilizing both the low-sensitivity receiver and the high-sensitivity receiver.

16. The UE of claim 15, wherein the at least one processor is further configured to:
determine an improvement in channel conditions; and
switch from the receive diversity mode to the low-sensitivity receiver.

17. The UE of claim 13, wherein the at least one processor is further configured to:
receive a grant to switch from the low-sensitivity receiver to the high-sensitivity receiver; and
release the low-sensitivity receiver and receive one or more page messages utilizing the high-sensitivity receiver.

18. The UE of claim 17, wherein the at least one processor is further configured to:
determine an improvement in channel conditions; and
switch from the high-sensitivity receiver to the low-sensitivity receiver.

19. A non-transitory computer-readable storage medium operable at a user equipment (UE) that comprises a low-sensitivity receiver and a high-sensitivity receiver, the computer-readable storage medium comprising instructions that, when executed by a processor, cause the processor to:

receive, in an idle state, one or more downlink transmissions utilizing the low-sensitivity receiver;

determine a decoding failure of the one or more downlink transmissions;

determine whether or not a pilot energy of the one or more downlink transmissions is less than a pilot energy threshold; and request to switch from the low-sensitivity receiver to the high-sensitivity receiver, in connection with the decoding failure and the pilot energy being less than the pilot energy threshold.

20. The non-transitory computer-readable storage medium of claim 19, wherein the instructions for causing the processor to request to switch from the low-sensitivity receiver to the high-sensitivity receiver further comprise instructions for causing the processor to request a resource manager for authorization to utilize the high-sensitivity receiver either individually to receive further downlink transmissions, or in coordination with the low-sensitivity receiver in a receive diversity configuration to receive the further downlink transmissions.

21. The non-transitory computer-readable storage medium of claim 19, further comprising:

instructions for causing the processor to receive a grant to switch from the low-sensitivity receiver to the high-sensitivity receiver; and instructions for causing the processor to operate in a receive diversity mode simultaneously utilizing both the low-sensitivity receiver and the high-sensitivity receiver.

22. The non-transitory computer-readable storage medium of claim 21, further comprising:

instructions for causing the processor to determine an improvement in channel conditions; and instructions for causing the processor to switch from the receive diversity mode to the low-sensitivity receiver.

23. The non-transitory computer-readable storage medium of claim 19, further comprising:

instructions for causing the processor to receive a grant to switch from the low-sensitivity receiver to the high-sensitivity receiver; and instructions for causing the processor to release the low-sensitivity receiver and receiving one or more page messages utilizing the high-sensitivity receiver.

24. The non-transitory computer-readable storage medium of claim 23, further comprising:

instructions for causing the processor to determine an improvement in channel conditions; and instructions for causing the processor to switch from the high-sensitivity receiver to the low-sensitivity receiver.

* * * * *